(12) United States Patent
Williams et al.

(10) Patent No.: US 6,561,714 B1
(45) Date of Patent: May 13, 2003

(54) BREAKAWAY JOINT FOR SUBSEA COMPONENTS

(76) Inventors: Michael R. Williams, 15419 Misty Forest Ct., Houston, TX (US) 77068; Frank M. Pattee, 5317 Shamrops Dr., Kenner, LA (US) 70065

(*) Notice: Subject to any disclaimer, the term of this patent is extended or adjusted under 35 U.S.C. 154(b) by 70 days.

(21) Appl. No.: 09/716,525

(22) Filed: Nov. 20, 2000

(51) Int. Cl.[7] ............................................. F16B 1/00
(52) U.S. Cl. ........................ 403/2; 285/3; 166/364
(58) Field of Search ......................... 403/2, 335–338, 403/341, 286; 285/1–3, 114, 148.8, 148.25, 148.28, 412; 166/364, 365, 242.7, 376, 359; 521/98, 99, 1, 726.1; 248/900

(56) References Cited

U.S. PATENT DOCUMENTS

| | | | |
|---|---|---|---|
| 3,331,397 A | * | 7/1967 | Mueller et al. ............. 137/797 |
| 3,659,877 A | * | 5/1972 | Kubasta ...................... 285/3 |
| 3,967,906 A | * | 7/1976 | Strizki ....................... 403/2 |
| 5,146,942 A | | 9/1992 | Taylor |
| 5,161,828 A | * | 11/1992 | Hynes et al. ............... 285/2 |
| 5,417,459 A | | 5/1995 | Gray et al. |
| 5,810,057 A | | 9/1998 | Westman |

FOREIGN PATENT DOCUMENTS

EP 0 764 809 A1 3/1997

* cited by examiner

Primary Examiner—Lynne H. Browne
Assistant Examiner—Michael P. Ferguson
(74) Attorney, Agent, or Firm—Henry C. Query, Jr.

(57) ABSTRACT

A breakaway joint for releasably connecting a first component to a second component, comprises a first member to which the first component is attached; a second member to which the second component is attached; a plurality of columnar members each having first and second ends, the first ends being coupled to the first member; and a mechanism engaged by both the second member and the second ends of the columnar members for latching the first member to the second member and for converting a tensile load acting between the first and second members into a compressive load acting on the columnar members; wherein when the tensile load reaches a predetermined level, the columnar members will buckle and the latching means will release the first member from the second member.

35 Claims, 8 Drawing Sheets

BREAKAWAY JOINT FOR SUBSEA COMPONENTS

BACKGROUND OF THE INVENTION

The present invention relates to a breakaway joint for releasably connecting two components of a subsea oil or gas production system. More particularly, the invention relates to a load limiting breakaway joint which comprises one or more columnar members that are designed to buckle and allow the joint to separate under a predetermined load.

Subsea oil and gas fields are often produced using subsea well equipment which is located on the seabed and tied back to a surface production facility via a submarine flowline. The flowline from the surface production facility is usually terminated near the subsea well equipment and then connected to the well equipment with a flowline jumper. Due to the typically great length of the flowline, a significant risk exists that the flowline may be snagged and dragged, for example, by an anchor from a vessel which is blown off location during a storm. If the flowline is dragged, substantial tension, bending and torsion stresses can develop at the connection between the jumper and the well equipment which may damage the well equipment. Thus, a need exists to protect the well equipment from damage in the event the flowline is snagged.

One prior art device that has been used to protect the well equipment in such circumstances is a load limiting breakaway flange joint. One or more such flange joints are commonly installed in the jumper, and each flange joint is designed to break away at a predetermined load, which is typically a small fraction of the breaking strength of the flowline. However, such flange joints usually do not function well when subjected only to tensile loads. In order for the flange joint to break away at a reasonably small predetermined load, it must be subjected to a fairly specific combination of torsion and bending stresses. To achieve such combination of stresses, awkward and difficult to install jumper configurations must often be used, and the well equipment must sometimes be arranged on the seabed in a specific orientation relative to the flowline, which can result in sub-optimal field layouts. In addition, the normal variations of the yield strength and ultimate strength of the flange joint material can lead to significant variations in the breakaway load.

Another prior art device which is used to protect the well equipment in the event the flowline is snagged is a load limiting pressure balanced joint. However, such joints are dependent on dynamic elastomer seals to balance the end thrust loads created by the internal pressure within the flowline or jumper, and such elastomer seals degrade over time and therefore pose potential leak paths. Also, due to the large size and weight of these joints, they must often be installed in the flowline rather than the jumper. When so located, the pressure balanced joint is subjected to the dynamic loads created when the flowline expands and contracts due to pressure and temperature cycles, which could potentially result in a premature breakaway. In addition, these joints employ shear pins or shear rings as the triggering mechanism for the breakaway feature, and such shear type devices often exhibit a wide range of failure loads due to the variability of the shear strength of the material and the tolerances of the working parts.

SUMMARY OF THE INVENTION

In accordance with the present invention, these and other disadvantages in the prior art are overcome by providing a breakaway joint for releasably connecting a first component to a second component. The breakaway joint comprises a first member to which the first component is attached, a second member to which the second component is attached and a plurality of columnar members each having first and second ends. The first ends of the columnar members are coupled to the first member, and the breakaway joint further comprises a latching mechanism which is engaged by both the second member and the second ends of the columnar members. The latching mechanism latches the first member to the second member and converts a tensile load acting between the first and second members into a compressive load acting on the columnar members. Thus, when the tensile load reaches a predetermined level, the columnar members will buckle and the latching mechanism will release the first member from the second member.

In accordance with the preferred embodiment of the invention, the first member comprises a receptacle and the second member comprises an outer surface having a portion which is slidably received in the receptacle. This engagement between the first and second members helps the breakaway joint to resist bending loads and thereby prevents the bending loads from causing the breakaway joint to separate prematurely.

In one embodiment of the breakaway joint of the present invention, the latching mechanism comprises a flange which is slidably mounted on an outer surface of the first member and a plurality of elongated members each having a first end which is connected to the flange and a second end which is connected to the second member. In addition, the second ends of the columnar members are engaged by the flange. Thus, the tensile loads acting between the first and second members are reacted through the elongated members and the flange to the columnar members, and when the columnar members buckle, the first member is allowed to separate from the second member.

In accordance with another embodiment of the invention, the receptacle of the first member comprises a first radial groove formed therein, the outer surface of the second member comprises a second radial groove which is located opposite the first radial groove when the second member is received in the first member, and the latching mechanism comprises a latch ring having radially outer and inner portions which are disposed in the first and second grooves, respectively, to connect the first member to the second member. In addition, the second ends of the columnar members are coupled to the latch ring to maintain the latch ring in the first and second grooves. Thus, the tensile loads acting between the first and second members are reacted though the second groove and the latch ring to the columnar members, and when the columnar members buckle, the latch ring will move into the first groove and allow the first member to separate from the second member.

In accordance with yet another embodiment of the invention, the receptacle of the first member comprises a first radial groove formed therein, the outer surface of the second member comprises a second radial groove which is located opposite the first radial groove when the second member is received in the first member, and the latching mechanism comprises a latch ring having radially outer and inner portions which are disposed in the first and second grooves, respectively, to connect the first member to the second member. The latching mechanism also comprises a reaction ring disposed in the first groove against the radially outer portion of the latch ring to maintain the radially inner portion of the latch ring in the second groove. In addition, the second ends of the columnar members are coupled to the reaction ring to maintain the reaction ring against the latch ring. Thus, the tensile loads acting between the first and second members are reacted though the second groove, the latch ring and the reaction ring to the columnar members, and when the columnar members buckle, the latch ring will move into the first groove and allow the first member to separate from the second member.

The columnar members are preferably designed to behave as slender columns. Accordingly, the axially compressive critical load required to cause the columnar members to collapse by bucking depends only on the length and the diameter of the columnar members and the modulus of elasticity, or Young's modulus, of the material of the columnar members. Since the length and diameter of the columnar members can be accurately controlled and the modulus of elasticity of the columnar members is highly consistent for a given material, the columnar members can be designed to have an accurately predictable critical load. Moreover, the critical load for the columnar members is independent of the yield strength and the ultimate strength of the material, which can vary widely. In addition, the critical load required to initiate buckling in the columnar members is greater than the load required to further collapse the columnar members. Therefore, once the columnar members are subjected to the predetermined critical load, they will buckle and collapse.

Thus, when installed in a flowline or a jumper which is connected to the well equipment, the breakaway joint of the present invention will effectively release the flowline from the well equipment in the event the flowline in snagged. Since the tensile load caused by the snag is transmitted to the columnar members, the breakaway joint will separate under a relatively predictable predetermined load. Furthermore, since the breakaway joint is particularly effective under tensile loads, no need exists to orient the jumper or the well relative to the flowline in order to induce torsion and bending stresses in the breakaway joint. In addition, the breakaway joint is relatively insensitive to compressive thermal loads that have complicated the design of certain prior art devices.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE PREFERRED EMBODIMENTS

The breakaway joint of the present invention is designed to releasably connect two components of a subsea oil or gas production system. The breakaway joint comprises a first member which is attached to one of the components, a second member which is attached to the other component, and a plurality of columnar members which under normal operation secure the first member to the second member, but which under the influence of a predetermined tensile load acting between the first and second members will buckle and allow the first member to separate from the second member. In this manner, the components can be disconnected under a predetermined, predictable separation load.

The first and second components can be any of a variety of components which are normally connected in operational engagement during installation and operation of a subsea production system. For example, the breakaway joint can be installed between contiguous segments of a fluid conduit, such as a pipeline, a flowline, a jumper or an umbilical. Also, the breakaway joint can be connected between such a fluid conduit and an item of equipment to which the fluid conduit is normally connected, such as a christmas tree, a manifold, a controls pod or, in the case the fluid conduit is a pipeline, a receiving facility or a subsea tie-in. In addition, the breakaway joint of the present invention can be integrated into the structural components of the well equipment. Such use of the breakaway joint may be advantageous where it is desirable for the structural component to break away at a predictable load less than the full strength of the component. For example, the breakaway joint may be connected to the structural supports or braces which support a pipeline, a template or a manifold, or integrated into wire ropes or cables which anchor a flowline or a riser. For purposes of brevity, the invention will be described hereafter in the context of a fluid conduit connector. Those of ordinary skill in this art will readily comprehend how to extend these teachings to make and use a breakaway joint for connecting structural components.

Figure 1:
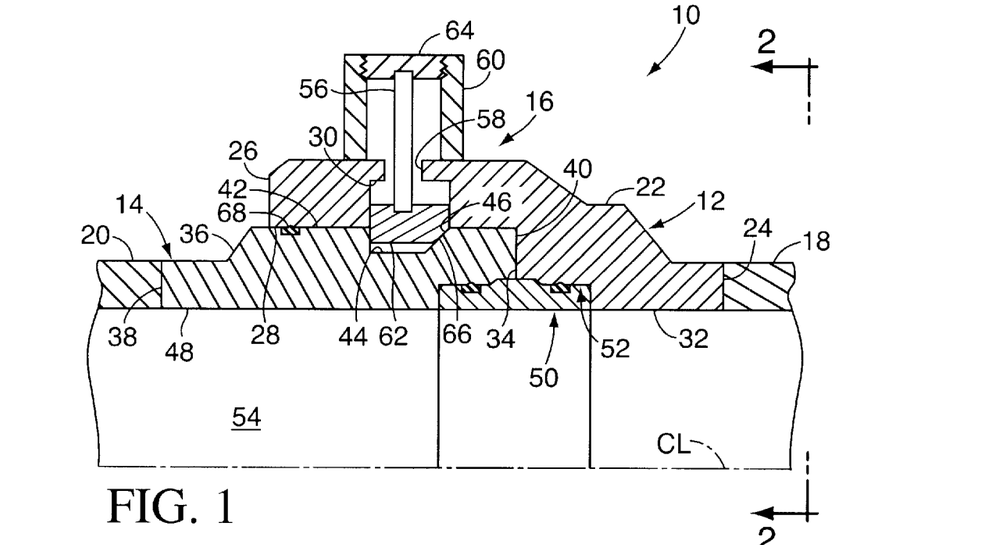
FIG. 1 is a longitudinal cross sectional view of the top portion of the breakaway joint of the present invention above its axial centerline CL, it being understood that the bottom portion is substantially a mirror image thereof.

Referring to FIG. 1, the breakaway joint 10 of the present invention is shown to comprise a first member 12 which is releasably connected to a second member 14 by a latching mechanism 16. The first member 12 is attached to a first component 18 and the second member 14 is attached to a second component 20, such as by welding. The first and second components 18, 20 could be, for example, adjacent portions of a flowline jumper which is connected to an item of well equipment, such as a subsea christmas tree (not shown). Alternatively, the first component 18 could be the termination of a flowline jumper and the second component 20 could be the portion of the Christmas tree to which the jumper is connected. As discussed above, other combinations of components are also contemplated by the present invention.

In the preferred embodiment of the invention, the first member 12 comprises a receptacle and the second member 14 comprises an outer surface having a portion which is slidably received in the receptacle. This engagement between the first and second members allows the breakaway joint 10 to resist bending loads and thereby prevent the bending loads from causing the breakaway joint to separate prematurely. For purposes of clarity, the first and second members will be referred to as the male and female members in the various embodiments of the breakaway joint described hereafter. However, it should be understood that the first and second members could have any practical configuration which allows for a mating engagement between these members.

As seen in FIG. 1, the female member 12 comprises a generally tubular body 22 having a first axial end 24 which is connected to the first tubular member 18, a second axial end 26, a cylindrical receptacle 28 which extends axially into the body 22 from the second axial end 26, and a radial release groove 30 which is formed coaxially in the receptacle 28. In the embodiment of the invention depicted in FIG. 1, the release groove 30 comprises a generally rectangular cross section. In addition, the female member 12 preferably comprises an inner diameter surface 32 which is flush with the inner diameter of the first tubular member 18, and the body 22 may include an annular step 34 formed between the receptacle 28 and the inner diameter surface 32.

The male member 14 comprises a generally cylindrical body 36 having a first axial end 38 which is connected to the second tubular member 20, a second axial end 40, an annular outer surface 42 which is adapted to be received within the receptacle 28, and a radial locking groove 44 which is formed coaxially in the outer surface 42. The locking groove 44 is positioned axially along the body 36 such that, when the outer surface 42 is received within the receptacle 28, the locking groove 44 is located opposite the relief groove 30. In this regard, the male member 14 is preferably inserted into the female member 12 until the second end 40 of the male member engages the step 34 of the female member. Also, the locking groove 44 preferably includes a generally rectangular cross section having at least one radially outwardly directed cam surface 46, the purpose of which will be described below. In addition, the male member 14 preferably comprises an inner diameter surface 48 which is flush with the inner diameter of the tubular member 20.

Since the purpose of the breakaway joint 10 in the embodiment of FIG. 1 is to convey potentially high pressure fluids, the breakaway joint preferably also comprises an annular sealing member 50 to seal between the female and male members 12, 14. In the embodiment of the invention depicted in FIG. 1, the sealing member 50 is a straight bore type radial seal, such as described in U.S. Pat. No. 4,930,791, which is co-owned herewith. The sealing member 50 seals within a seal pocket 52 defined by adjacent radial recessed portions of the female and male members 12, 14. Also, the inner diameter of the sealing member 50 is preferably flush with the inner diameter surfaces 32, 48 of the female and male members to thereby form a uniform flow path 54 through the breakaway joint 10. It should be understood, however, that any suitable sealing member could be used for sealing member 50, including any metallic or non-metallic seal which has traditionally been used to seal between two connecting tubular members.

Figure 2:
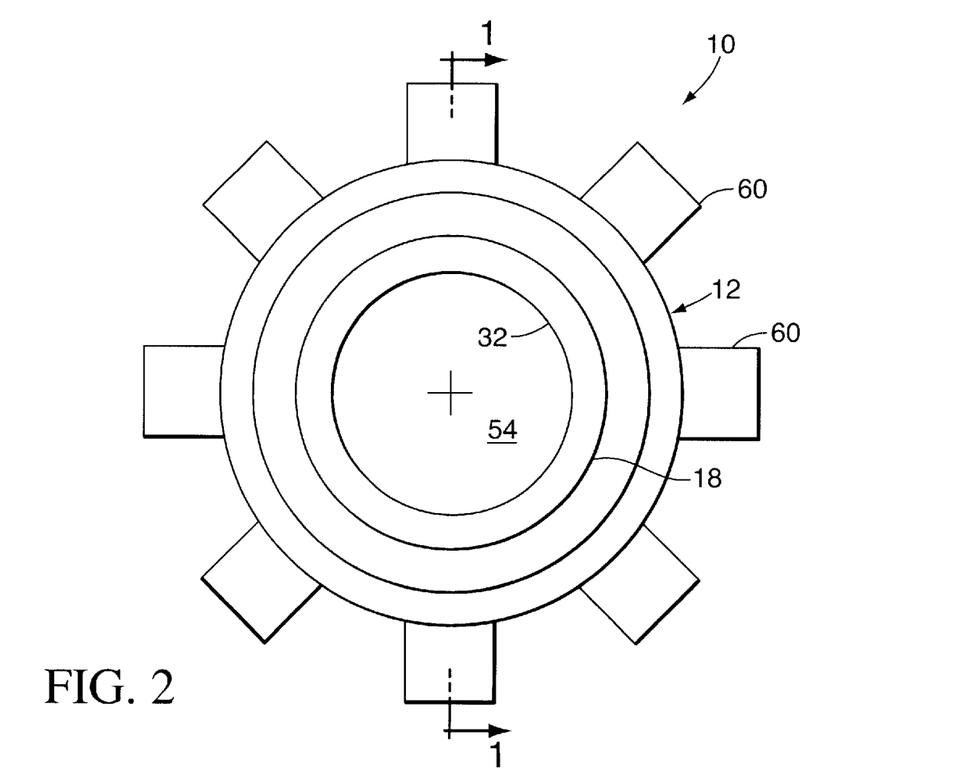
FIG. 2 is a side elevational view of the breakaway joint of FIG. 1 taken along line 2—2 of FIG. 1.

Referring to FIGS. 1 and 2, the latching mechanism 16 is shown to comprise a plurality of columnar members 56 disposed radially about the female member 12. Each columnar member 56 passes through a radial hole 58 formed in the female member 12 and has a first end which is fixed to a support member 60 and a second end which is fixed to an expandable latch ring 62. Each support member 60 is securely attached to the female member 12, such as by welding. Furthermore, each support member 60 includes a threaded plug 64 to which the columnar member 56 is fixed to allow for adjustment of the radial position of the latch ring 62. In the embodiment of the invention shown in FIGS. 1 and 2, each support member 60 is shown to comprise a generally cylindrical configuration, and one support member is provided for each columnar member 56. However, the support member 60 could comprise any practical configuration, and a single, circumferentially enlarged support member could be provided for two or more columnar members.

The latch ring 62 in the embodiment of the invention shown in FIG. 1 has a generally rectangular cross section with a radially outer portion and a radially inner portion. The width of the radially outer portion is approximately the same as the axial width of the release groove 30. In addition, the radially inner portion includes a radially inwardly facing cam surface 66 formed thereon, and the width of the radially inner portion is approximately the same as the axial width of the locking groove 44. It should be understood that, although the cam surfaces 46, 66 are shown as being generally flat, they could have any suitable shape. In addition, the radially inner portion of the latch ring 62 could comprise two oppositely directed radially inwardly facing cam surfaces, in which event the locking groove 44 would be provided with corresponding cam surfaces. Moreover, the latch ring 62 could comprise an array of individual latch segments, with one or more columnar components 56 fixed to each latch segment. This alternative would allow the latch segments to be installed via ports machined through the female member 12. Other configurations of the latch ring 62, including the cam surfaces 44, 66, are also contemplated by the present invention. Finally, the breakaway joint 10 preferably also comprises a seal 68 positioned between the receptacle 28 of the female member 12 and the outer surface 42 of the male member 14 outboard of the latching mechanism 16. The seal 68 functions to prevent seawater from entering the breakaway joint and to contain any lubricating and/or corrosion resistant fluid within the breakaway joint to ensure proper functioning of the latching mechanism 16.

In the latched condition of the breakaway joint 10, which is shown in FIG. 1, the columnar members 56 maintain the latch ring 62 in a radial position wherein the radially outer portion of the latch ring 62 is positioned in the release groove 30 and the radially inner portion of the latch ring 62 is wedged in the locking groove 44, with the inwardly facing cam surface 66 contacting the outwardly facing cam surface 46. The plugs 64 may be adjusted in or out to maintain the latch ring 62 in the proper position and to impose any desired pre load on the columnar members 56. In this condition, relative axial movement of the female member 12 away from the male member 14 is restricted by the latch ring 62. Moreover, any axial separation force acting on the breakaway joint 10 will be converted by the cam surfaces 46, 66 into a radially outward force acting on the latch ring 62, which in turn will be reacted into the columnar members 56 and the support members 60. Thus, the tensile load acting on the breakaway joint 10 will be converted into an axially compressive load acting on the columnar members 56.

The columnar members 56 are preferably designed to behave as slender columns. Such columns are typically characterized by Euler's equation or one of its variations. According to Euler's equation, the axially compressive critical load required to cause the column to collapse by buckling depends only on the length and the diameter of the column and the modulus of elasticity, or Young's modulus, of the material of the column. The length and diameter of the columnar members 56 can be accurately controlled. In addition, the modulus of elasticity of the columnar members is highly consistent for a given material. Therefore, given a specific geometry and material for the columnar members 56, the critical load can be predicted with great accuracy. Conversely, the columnar members can be designed to have a predetermined critical load by properly selecting the length, diameter and material of the members. Thus, the critical load for the columnar members is independent of the yield strength and the ultimate strength of the material, which can vary widely. In addition, the critical load required to initiate buckling in a slender column is greater than the load required to further collapse the column. Therefore, once the columnar members are subjected to the predetermined critical load, they will buckle and collapse.

Accordingly, the breakaway joint 10 is capable of separating under a predetermined, highly predictable tensile load, which is selected to be a fraction of the breaking strength of the components to which it is connected. Under the influence of this predetermined separation load, the columnar members 56 will collapse and allow the cam surface 46 to push the latch ring 62 radially outward into the release groove 30. It should be noted that the cam surfaces 46 and 66 may be finished and/or coated to provide a desired level of friction between these two surfaces. In addition, the release groove 30 is sufficiently deep to accommodate the entire latch ring 62, and the holes 58 in the female member 12 are preferably sufficiently large so as not to interfere with the lateral displacement of the columnar members 56 as they buckle and collapse, at least to the degree required to allow the latch ring 62 to displace fully into the release groove 30. Once the latch ring 62 is positioned in the release groove 30, the male member 14 is free to separate from the female member 12 under the further influence of the separation force. Therefore, the flowline will be disconnected from the well equipment, and the well equipment will be effectively protected from damage by the separation load.

Figure 3:
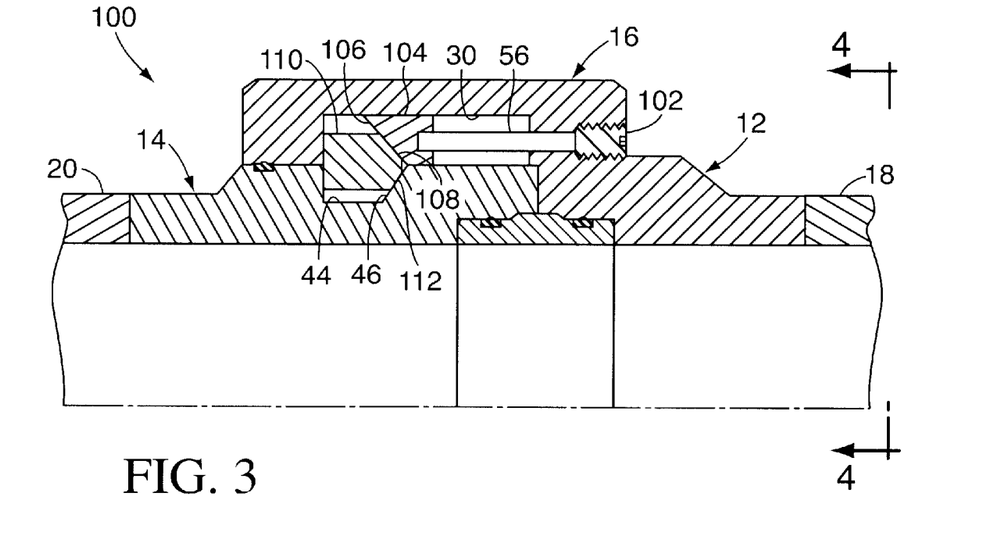
FIG. 3 is a longitudinal cross sectional view of the top portion of another embodiment of the breakaway joint of the present invention above its axial centerline CL, it being understood that the bottom portion is substantially a mirror image thereof.
Figure 4:
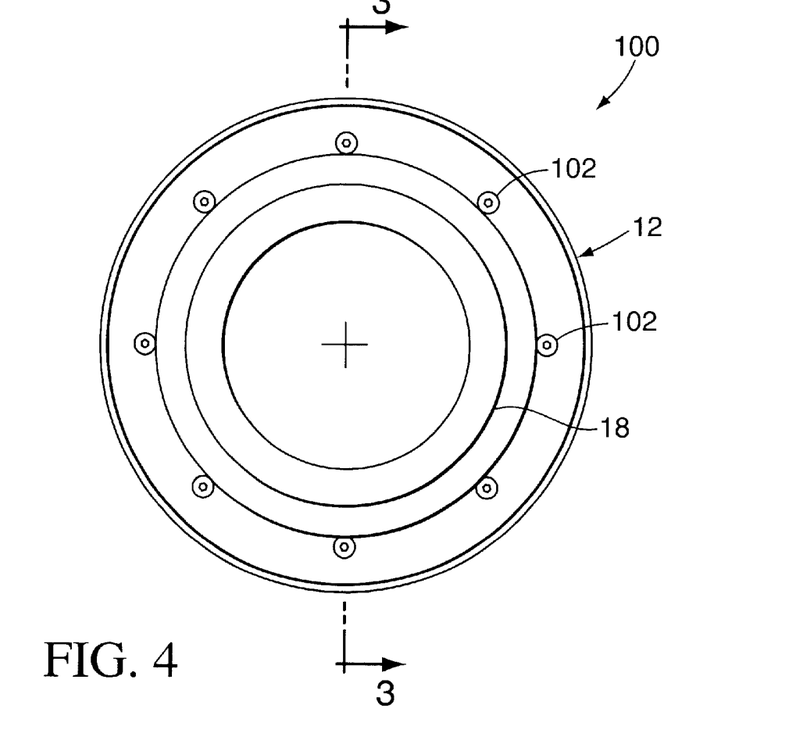
FIG. 4 is a side elevational view of the breakaway joint of FIG. 3 taken along line 4—4 of FIG. 3.

Another embodiment of a breakaway joint according to the present invention is shown in FIGS. 3 and 4. In this embodiment, the breakaway joint 100 can be seen to comprise many of the same components as the breakaway joint 10 previously discussed. However, in this embodiment the latching mechanism 16 does not comprise a separate support member such as support member 60. Instead, each columnar member 56 is positioned approximately parallel to the centerline CL of the breakaway joint 100 in an elongated release groove 30 formed in the female member 12. A first end of each columnar member 56 is fixed to a plug 102 which is threaded into a corresponding hole in the female member 12, and a second end of each columnar member is fixed to a reaction ring 104 which is disposed in the release groove 30. The reaction ring 104 includes a radially inwardly facing cam surface 106 which engages a radially outwardly facing cam surface 108 formed on a radially outer portion of a split latch ring 110. The latch ring 110 also includes a radially inwardly facing cam surface 112 formed on a radially inner portion thereof which engages the radially outwardly facing cam surface 46 of the locking groove 44.

In the latched condition of the breakaway joint 100, which is shown in FIG. 3, the columnar members 56 maintain the reaction ring 104 against the latch ring 110 such that the radially inner portion of the latch ring is wedged in the locking groove 44 and the radially outer portion of the latch ring is wedged between the reaction ring 104 and the release groove 30. The plugs 102 may be adjusted in or out to properly position the reaction ring 104 and impose any desired pre load on the columnar members 56. With the latch ring 110 so positioned, axial movement of the male member 14 relative to the female member 12 is restricted by the latch ring. Furthermore, the axial separation forces acting on the breakaway joint 100 will be converted by the cam surfaces 46, 112 into a radially outwardly directed force acting on the latch ring 110. This radially outwardly directed force will in turn be converted by the cam surfaces 106, 108 in to an axial force acting on the reaction ring 104, which will result in an axially compressive force acting on the columnar members 56. Once the axial compressive force acting on the columnar members 56 reaches the predetermined critical load, the columnar members will buckle and allow the reaction ring 104 to move to the right (as viewed in FIG. 3) as the latch ring 110 displaces radially outward into the release groove 30. In this position of the latch ring 110, the male member 14 is free to separate from the female member 12 under continued separation loads.

Another embodiment of the invention is illustrated in FIGS. 5–8. In this embodiment, the breakaway joint, which is indicated generally by reference number 200, is shown to comprise a female member 202 releasably secured to a male member 204 by a latching mechanism 206. The male and female members are connected to respective components (not shown). As shown more clearly in FIGS. 6 and 7, the female member includes a preferably tubular body 208 having an outer, preferably annular surface 210 with a tapered step 212 formed thereon, a cylindrical receptacle 214 extending into the female member from a first end 216 thereof, and a radial support flange 218 attached to or formed integral with the body 208 proximate the first end 216. The support flange 218 preferably includes an angled surface 220 on its side opposite the first end 216, the purposed of which will be described later. The male member 204 comprises a preferably tubular body 222 having a cylindrical outer surface 224 formed adjacent a first end 226 of the male member, and a radial locking flange 228 attached to or formed integral with the body 222. As in the previous embodiments, the outer surface 224 of the male member 204 is adapted to be slidably received in the receptacle 214 of the female member 202. The breakaway joint preferably also comprises an annular seal 230 to isolate the area between the male and female members from the surrounding seawater. In the event the breakaway joint 200 is used to connect fluid conduits, the breakaway joint preferably also comprises a sealing member 232, which is similar to sealing member 50 discussed above.

In this embodiment of the invention, the latching mechanism 206 comprises a split flange 234 which is slidably supported on the outer surface 210 of the female member 202, a plurality of elongated tie rod bolts 236 which are disposed around the male and female members between the split flange 234 and the locking flange 228, and a plurality of columnar members 238 which are disposed around the female member between the split flange 234 and the support flange 218. The split flange 234 is comprised of preferably two or more arcuate segments 240 which are held together on the female member 202 by a split or frangible retainer ring 242. In addition, the diameter of the circle on which the tie rod bolts 236 are disposed is slightly smaller than the diameter of the circle on which the columnar members 238 are disposed, and when the breakaway joint is subject to tensile loads this causes the tie rod bolts to urge the segments 240 of the split flange 234 toward the outer surface 210 of the female member 202 rather than away from the female member.

Figure 5:
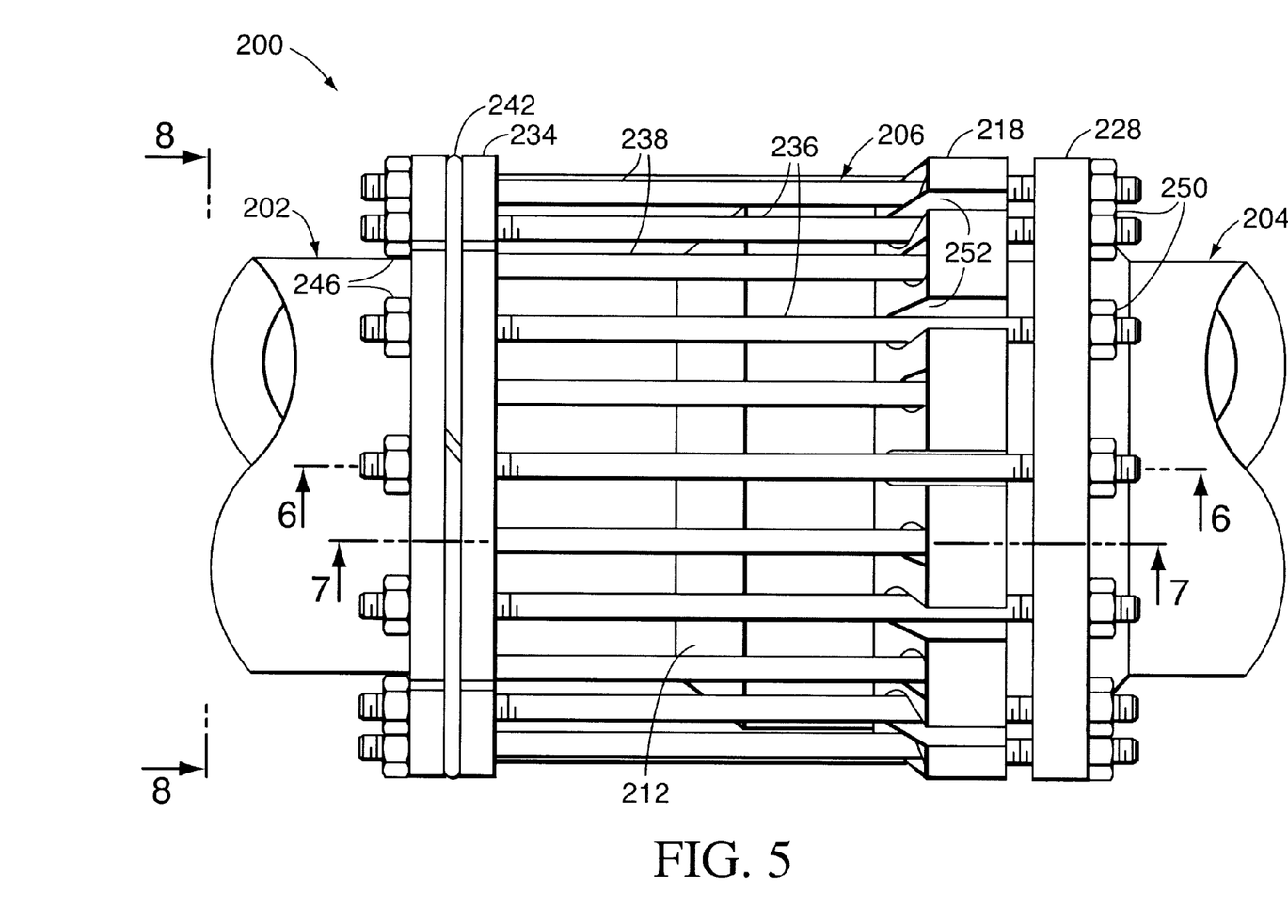
FIG. 5 is a front elevational view of another embodiment of the breakaway joint of the present invention.
Figure 6:
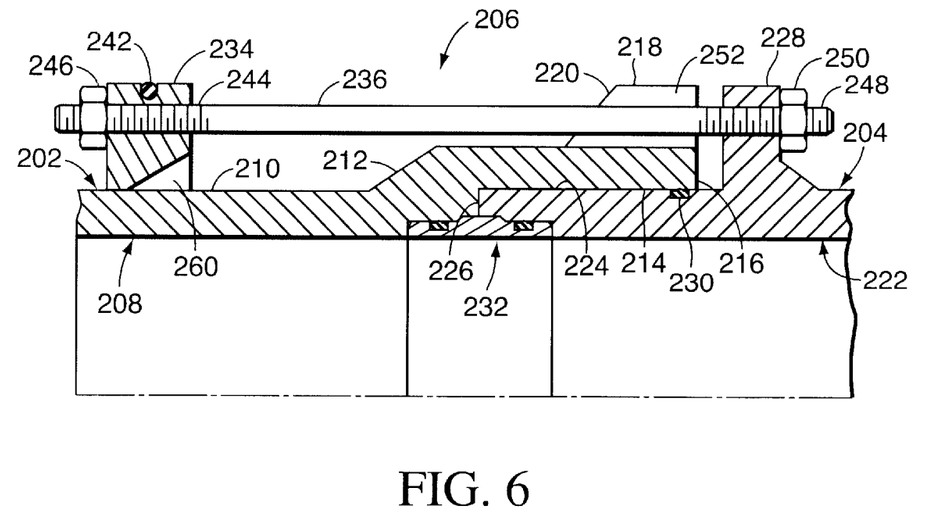
FIG. 6 is a partial longitudinal cross sectional view of the breakaway joint of FIG. 5 taken along line 6—6 of FIG. 5.

Referring specifically to FIGS. 5 and 6, each tie rod bolt 236 comprises a first threaded end 244 which is inserted through a corresponding hole in the split flange 234 and secured therein by a first nut 246, and a second threaded end 248 which is inserted through a corresponding hole in the locking flange 228 and secured therein by a second nut 250. In this manner, the split flange 234 is restricted from moving axially to the left (as viewed in FIG. 6) by the tie rod bolts 236. The nuts 246, 250 not only facilitate the assembly of the breakaway joint 200, but also provide a means by which the axial position of the split flange 234 relative to the locking flange 228 may be adjusted. However, it should be understood that, instead of using one or both nuts 246, 250, one or both of the threaded ends 244, 248 could be threaded into their corresponding holes in the respective flanges 234, 228. Furthermore, the support flange 218 is preferably provided with a number of relief grooves 252 through which the tie rod bolts 236 are allowed to pass in order to avoid interference between the tie rod bolts and the female member 202.

Figure 7:
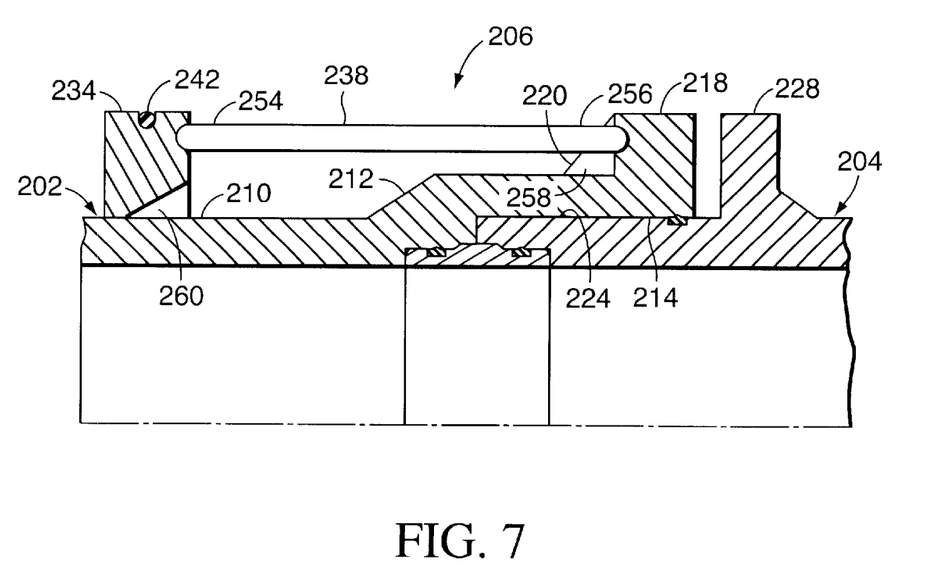
FIG. 7 is a partial longitudinal cross sectional view of the breakaway joint of FIG. 5 taken along line 7—7 of FIG. 5.
Figure 8:
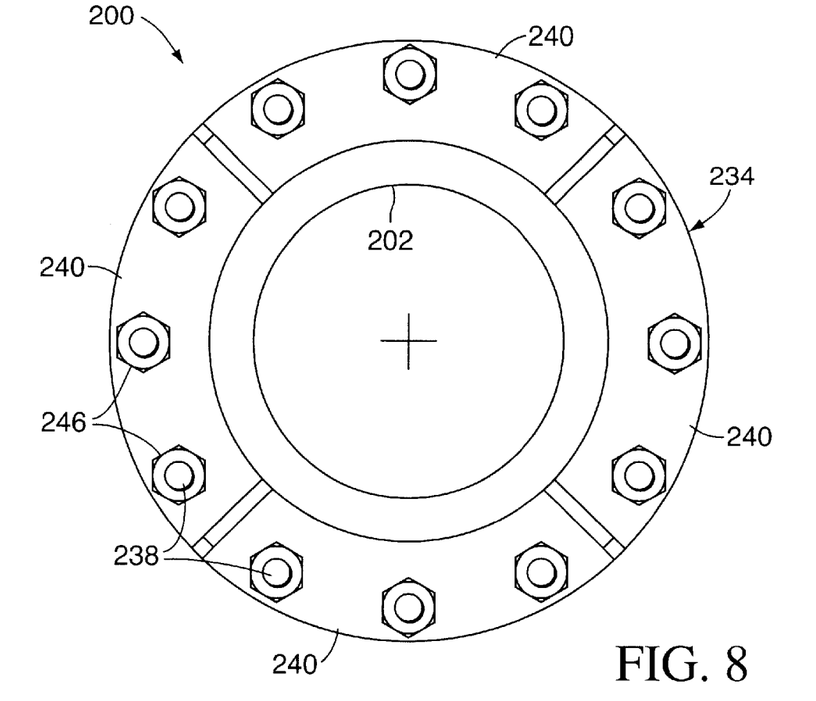
FIG. 8 is a side elevational view of the breakaway joint of FIG. 5 taken along line 8—8 of FIG. 5.

Referring specifically to FIGS. 5 and 7, each columnar member 238 comprises a first end 254 which is received in a corresponding socket formed in the split flange 234 and a second end 256 which is received in a corresponding socket formed in the support flange 218. The columnar members 238 are preferably held within the sockets by tightening the split flange 234 against the columnar members using the tie rod bolts 236. However, the second end 256 of each columnar member may be threaded into its respective socket to secure the columnar members to the support flange 218. As in the previous embodiments, the columnar members 238 are designed to behave as slender columns; that is, they will buckle and collapse under a predetermined, predictable compressive load. In this regard, the angled surface 220 of the support flange 218 is preferably relieved as at 258 so as not to interfere with the behavior of the columnar members.

Under normal operating conditions, the tie rod bolts 236 will maintain the columnar members 238 firmly against the support flange 218 to rigidly secure the male member 204 to the female member 202, and the stiffness of the columnar members is sufficient to withstand the normal tensile loads to which the breakaway joint 200 may be subjected. In this condition, the nuts 246, 250 may be selectively tightened to impose a desired amount of preload in the columnar members 238. When the breakaway joint 200 is subjected to a separation force, the tensile loads which would otherwise act to separate the female and male members 202, 204 are reacted through the tie rod bolts 236, into the split flange 234, through the columnar members 238 and into the support flange 218 of the female member. Thus, the separation force acting on the breakaway joint 200 is converted into a compressive force which is reacted into the columnar members 238.

When the separation force acting on the breakaway joint reaches a predetermined critical load, the columnar members 238 will buckle and collapse, allowing the tie rod bolts 236 to pull the split flange 234 to the right (as viewed in FIGS. 5–7) as the male member 204 begins to separate from the female member 202. Continued separation of the male and female members will result in the split flange 234 being pulled up and over the tapered step 212 of the female member 202. This will force the segments 240 of the split flange 234 radially outwardly, which in turn will cause the retainer ring 242 to stretch or break and thereby allow the segments 240 to separate. The split flange 234 preferably includes an angled inner diameter surface 260 to facilitate movement of the split flange over the tapered step 212. Continued separation of the male and female members will pull the split flange up and over the angled surface 220 of the support flange 218, which will allow the segments 240 to pass over the support flange and thereby completely disengage the tie rod bolts 236 from the female member 202. Consequently, the male member 204 will be completely separated from the female member 202, and the components to which these members are attached will be disconnected. It should be understood that, in the absence of a tapered step 212 on the outer surface 210 of the female member 202, the separation of the segments 240 of the split flange 234 can be accomplished solely by the angled surface 220 of the support flange 218.

The breakaway joint 200 is particularly suitable for applications which require the breakaway joint to be integrated into the component, such as a subsea pipeline or flowline, rather than installed on the end of the component. Since the tie rod bolts 236 and the columnar members 238 are mounted external to the female and male members 202, 204, the breakaway joint is relatively easy to manufacture. In addition, this arrangement results in a breakaway joint which has a relatively small diameter. Consequently, the breakaway joint can more easily pass through the equipment which is used to install the subsea components, such as the rollers and tensioners which are used to install subsea flowlines.

Figure 9:
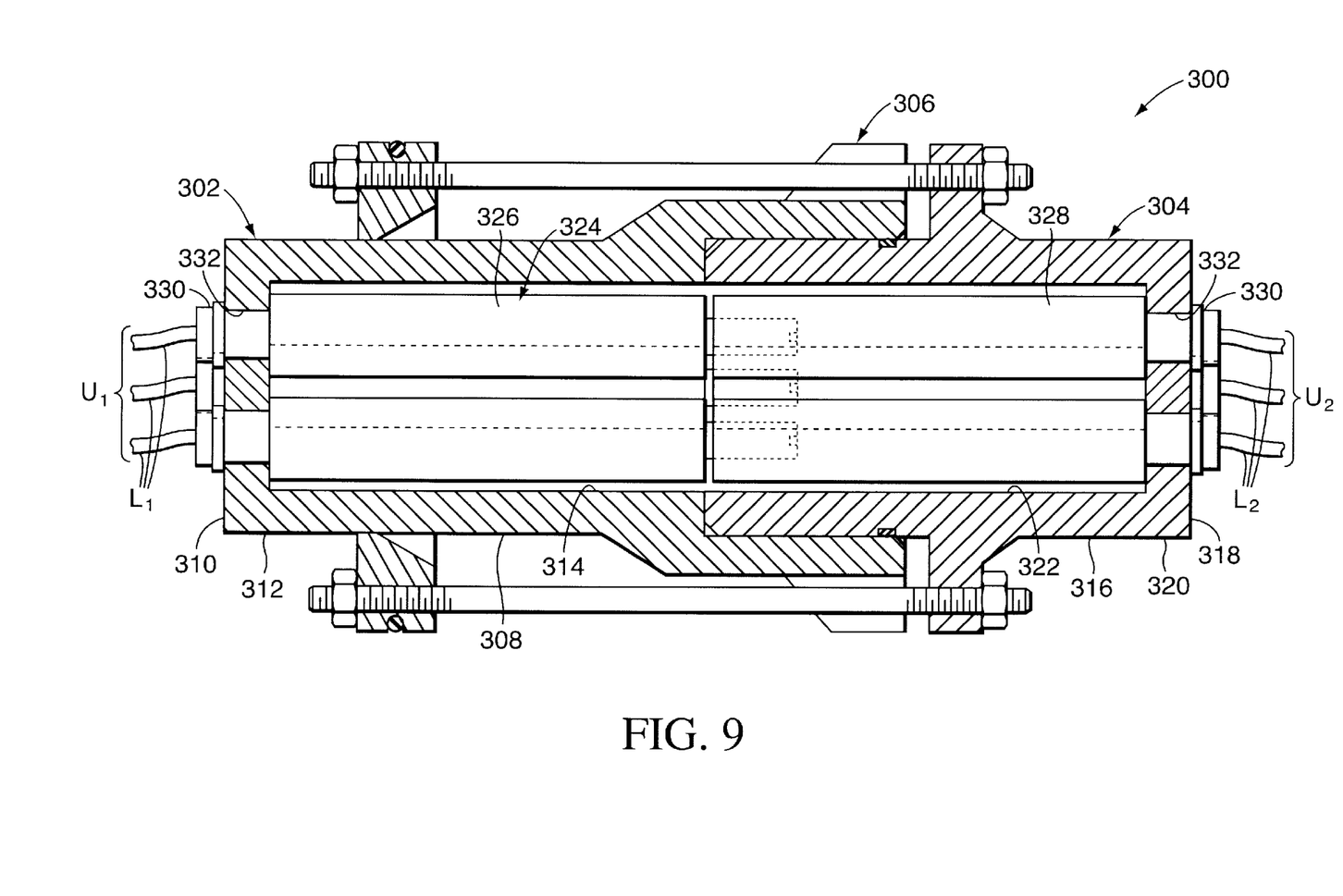
FIG. 9 is a longitudinal cross sectional view of the breakaway joint of FIG. 5 adapted for use as an umbilical connector.

Another embodiment of the present invention is illustrated in FIG. 9. In this embodiment the breakaway joint, which is indicated generally by reference number 300, is shown connecting two successive sections $U_1$, $U_2$ of an umbilical. An umbilical is typically a bundle of two or more hydraulic lines, electrical cables, and/or fluid conduits which convey fluids and/or control signals between a surface ship or structure and the well equipment. For purposes of simplicity, the umbilical depicted in FIG. 9 is shown to comprise only hydraulic lines. Furthermore, while the breakaway joint 300 is similar in many respects to the breakaway joint of FIG. 5, it should be understood that breakaway joint 300 could be based on any of the embodiments previously discussed.

The breakaway joint 300 comprises a female member 302 which is releasably connected to a male member 304 by a latching mechanism 306. The female member includes a tubular body 308 having a preferably integral side panel 310 located at a first end 312 of the body which defines a female socket 314 opening toward the male member 304. Similarly, the male member comprises a tubular body 316 having a preferably integral side panel 318 located at a first end 320 of the body which defines a male socket 322 opening toward the female member 302. The latching mechanism 306 in this embodiment is identical in both design and operation to the latching mechanism 206 discussed previously.

The breakaway joint further comprises a conventional hydraulic coupler 324 for joining each line $L_1$ of the first umbilical section $U_1$ with a corresponding line $L_2$ of the second umbilical section $U_2$. Each hydraulic coupler 324 includes a male coupling 326, which in FIG. 9 is shown positioned in the female socket 314, and a female coupling 328, which in FIG. 9 is shown positioned in the male socket 322. The hydraulic lines $L_1$ and $L_2$ are connected to the couplings 326, 328 using conventional fittings. The male and female couplings 326, 328 each typically include portions 330 which are received in corresponding holes 332 formed in the side panels 310, 318, respectively, to secure the couplings to the female and male members 302, 304. The female and male members 302, 304 are designed so that the male and female couplings 326, 328 will fully engage when the female and male members are connected. Therefore, when the female and male members are disconnected, the male and female couplings will become uncoupled.

In operation of the breakaway joint 300, the latching mechanism 306 maintains the female and male members 302, 304, and thus the male and female couplings 326, 328, securely connected under normal operating loads. If the breakaway joint is subjected to a predetermined tensile load, such as may result when the umbilical is snagged by an anchor, the latching mechanism 306 will release the female and male members, and the male and female couplings 326, 328 will become uncoupled, thereby preventing damage to the umbilical or any of the production components to which the umbilical is connected.

Figure 10:
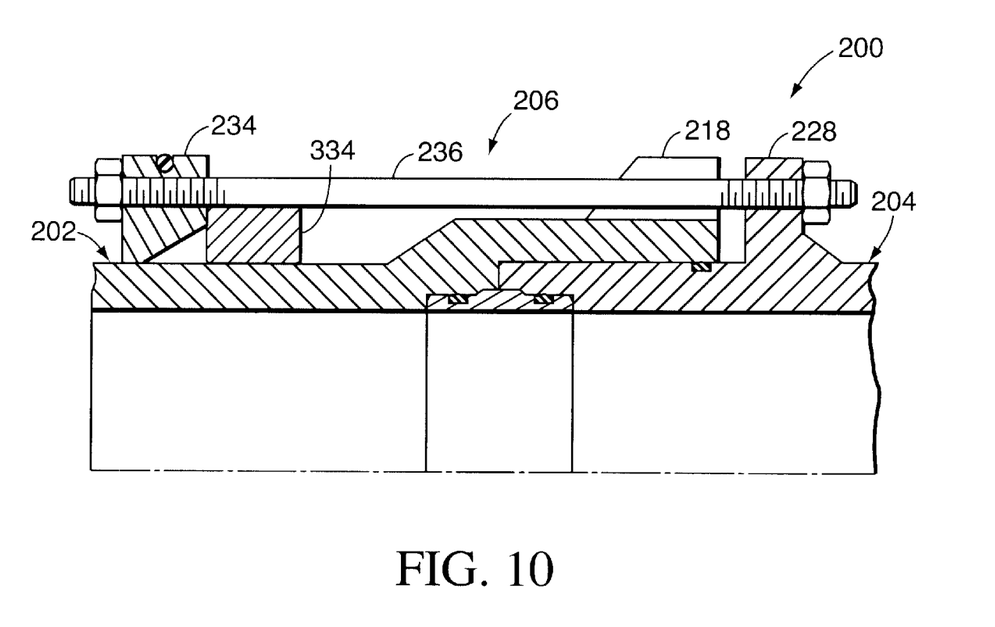
FIG. 10 is a longitudinal cross sectional view of the breakaway joint of FIG. 5 showing one embodiment of a temporary support mechanism for the breakaway joint.

During installation of certain subsea components, such as a flowline, the tensile loads imparted on the breakaway joint may be greater than that for which the columnar members are designed to buckle. Thus, the breakaway joint of the present invention also preferably includes a temporary support mechanism for the columnar members to prevent the male and female members from separating during installation of the components to which the breakaway joint is connected. Referring to FIG. 10, one embodiment of a temporary support mechanism is shown installed on the breakaway joint 200 of FIG. 5. The support mechanism of this embodiment is an annular support collar 334 which is mounted to the female member 202 against the inboard side of the split flange 234. The collar 334 can comprise, for example, a uniform cylinder which is slipped onto the female member and secured thereto with set screws or the like, or a split cylinder which is installed over the female member and clamped together with screws. The collar is preferably constructed of a material which will corrode away in seawater, such as aluminum. In addition, the collar is preferably suitably isolated from the breakaway joint and/or the components to which the breakaway joint is connected so as not to be affected by any cathodic protection system that may be employed with the components. When installed on the breakaway joint, the collar 234 will prevent the tie rod bolts from pulling the split flange 234 toward the support flange 218. Thus, the collar will prevent any separation loads from being reacted into the columnar members (which are not visible in FIG. 10). However, after the subsea component has been installed and the breakaway joint is exposed to seawater for a period of time, the collar 334 will corrode away and leave the latching mechanism 206 as the only component securing the male member 204 to the female member 202.

Figure 11:
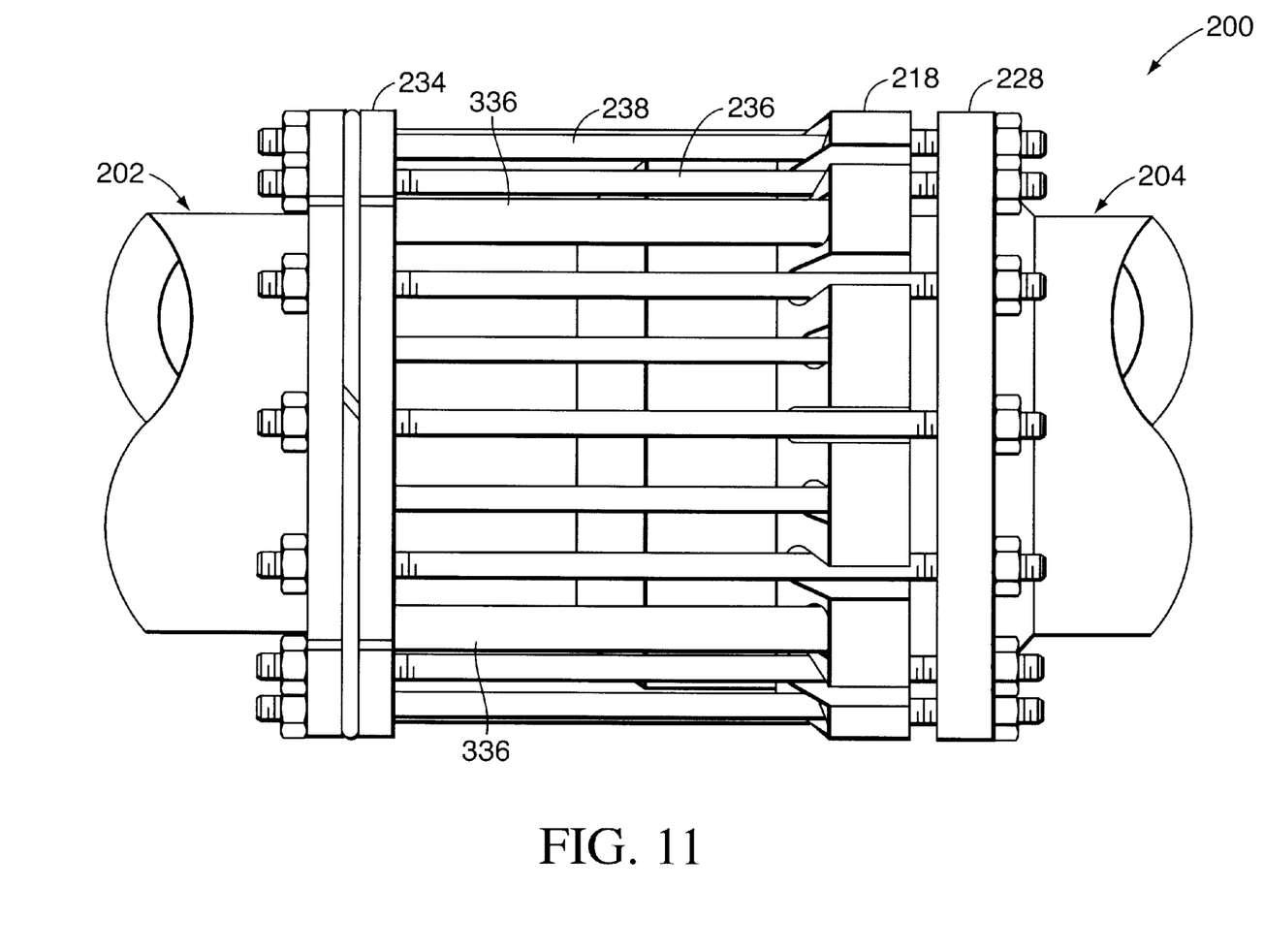
FIG. 11 is a front elevational view of the breakaway joint of FIG. 5 showing another embodiment of a temporary support mechanism for the breakaway joint.

Another support mechanism for preventing the male and female members from separating during installation of the components to which the breakaway joint is connected is shown in FIG. 11 installed on the breakaway joint 200 of FIG. 5. In this embodiment, the support mechanism comprises a number of support columns 336 installed between the split flange 234 and the support flange 218. The support columns 336 will share the compression load that is transmitted to the columnar members 238 by a tensile load acting on the breakaway joint 200. The support columns 336 are preferably constructed of a material that will corrode when exposed for a period of time to seawater. The ends of the support columns 336 are received in corresponding sockets formed in the spit flange and the support flange. Thus, while the support columns may be larger or smaller in diameter than the columnar members, they are preferably the same diameter as the columnar members to simplify the manufacture of the split flange and the support flange. In addition, the support columns 336 are preferably suitably isolated from the breakaway joint and/or the components to which the breakaway joint is connected so as not to be affected by any cathodic protection system that may be employed with the components.

In this embodiment, the breakaway joint is designed such that the number and size of the columnar members 238 are sufficient to secure the male member 204 to the female member 202 in the absence of the support columns after installation of the components to which the breakaway joint is connected. During installation of the components, the support columns 336 and the columnar members 238 will share the increased separation loads to which the breakaway joint may be subjected. After installation, however, the support columns 336 will corrode away and leave the columnar members 238 to secure the female member 202 to the male member 204.

Figure 12:
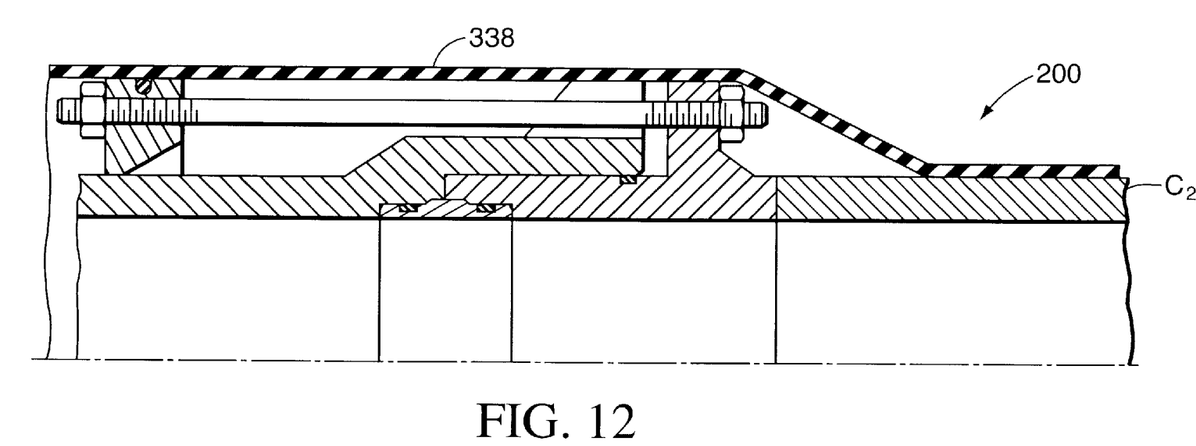
FIG. 12 is a partial longitudinal cross sectional view of the breakaway joint of the present invention showing one embodiment of an encapsulation device for the breakaway joint.

The breakaway joint of the present invention may also comprise an encapsulation device to protect the breakaway joint from seawater and to prevent it from hanging up on the equipment used to install the components to which the breakaway joint is attached. For example, when the breakaway joint is used to join successive sections of a flowline, an encapsulation device may be desirable to enable the breakaway joint to more easily pass through the rollers and tensioners used to install the flowline. Referring to FIG. 12, one embodiment of an encapsulation device which may be suitable for use with the present invention is shown installed on the breakaway joint of FIG. 5. In this embodiment, the encapsulation device comprises a sleeve 338 which encases substantially the entire breakaway joint from the first subsea component (not shown) to the second subsea component $C_2$. The sleeve 338 is preferably made of a suitable rubber or plastic material which is rigid enough to generally maintain its shape through the installation equipment but which is sufficiently frangible so as not to interfere with the operation of the breakaway joint.

Figure 13:
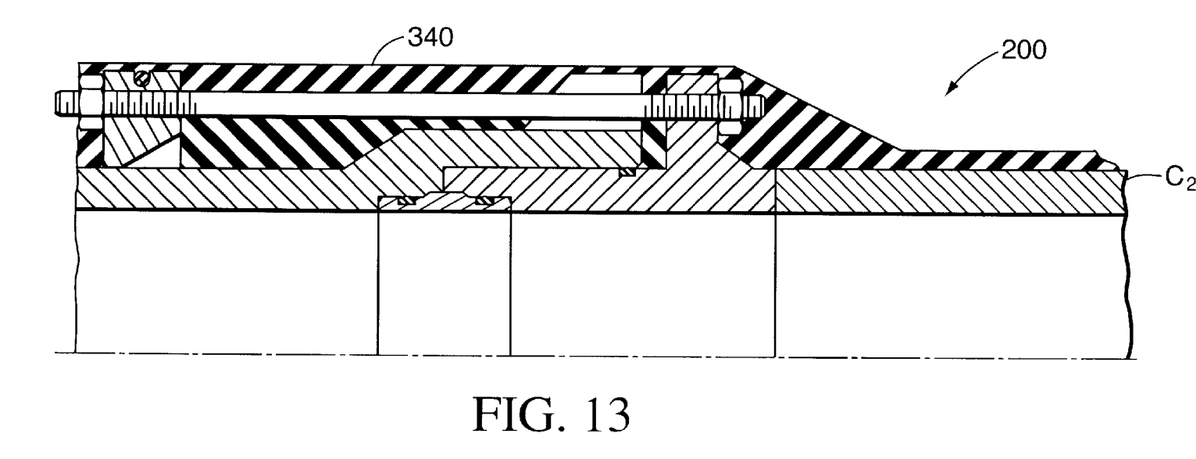
FIG. 13 is a partial longitudinal cross sectional view of the breakaway joint of the present invention showing another embodiment of an encapsulation device for the breakaway joint.

Referring to FIG. 13, another embodiment of an encapsulation device is shown installed on the breakaway joint of FIG. 5. In this embodiment, the encapsulation device is a form 340 which is molded from a preferably quick setting resin, such as a urethane type rubber. The form may be installed using a simple two-part sheet metal mold which is clamped over the breakaway joint. The form is preferably tapered on each end to form a smooth transition between the outer diameter of the component $C_2$ and the outer diameter of the breakaway joint. In this manner, the form will create a smooth encapsulation for the breakaway joint that will allow the breakaway joint to pass smoothly through the installation equipment.

It should be recognized that, while the present invention has been described in relation to the preferred embodiments thereof, those skilled in the art may develop a wide variation of structural and operational details without departing from the principles of the invention. For example, the various elements illustrated in the different embodiments may be combined in a manner not illustrated above. Therefore, the appended claims are to be construed to cover all equivalents falling within the true scope and spirit of the invention.

We claim:

1. A breakaway joint for releasably connecting a first component to a second component, the breakaway joint comprising:
   a first member to which the first component is attached;
   a second member to which the second component is attached;
   a plurality of columnar members each having first and second ends, the first ends being coupled to the first member; and
   means engaged by both the second member and the second ends of the columnar members for latching the first member to the second member and for converting a tensile load acting axially between the first and second members into a compressive load acting on the columnar members;
   wherein when the tensile load reaches a predetermined level, the columnar members will buckle and the latching and converting means will release the first member from the second member.

2. The breakaway joint of claim 1, wherein the first member comprises a receptacle and the second member comprises an outer surface having a portion which is slidably received in the receptacle.

3. The breakaway joint of claim 2, wherein the latching and converting means comprises:
   a first flange which is slidably mounted on an outer surface of the first member; and
   a plurality of elongated members each having a first end connected to the first flange and a second end connected to the second member;
   wherein the second ends of the columnar members are engaged by the first flange; and
   wherein the tensile load is reacted though the elongated members and the first flange to the columnar members, and when the columnar members buckle, the first member is allowed to separate from the second member.

4. The breakaway joint of claim 3, wherein:
   the first member comprises a second flange extending radially from its outer surface between the first flange and the second member;
   the second flange comprises an angled side surface facing the first flange;
   the first ends of the columnar members are engaged by the second flange;
   the first flange comprises a split flange; and
   when the columnar members buckle, the elongated members will pull the first flange up and over the angled side surface of the second flange to allow the first member to separate from the second member.

5. The breakaway joint of claim 4, wherein the split flange comprises at least two segments which are held together by a retainer ring.

6. The breakaway joint of claim 3, wherein the latching and converting means further comprises means for adjusting the axial distance between the first flange and the second member.

7. The breakaway joint of claim 6, wherein the adjusting means comprises:
   threads formed on at least the first end of each elongated member; and
   a nut which engages a portion of the first end which is inserted through a corresponding hole in the first flange;
   whereby rotation of the nuts varies the axial distance between the first flange and the second member.

8. The breakaway joint of claim 3, further comprising means for temporarily supporting the columnar members so that the first member will remain connected to the second member for a period of time when the tensile load is higher than the predetermined level.

9. The breakaway joint of claim 8, wherein the supporting means comprises a support collar mounted on the first member between the first flange and the second member.

10. The breakaway joint of claim 9, wherein the support collar is comprised of a material which will corrode away in an ambient environment in which the breakaway joint is intended to be used after the period of time.

11. The breakaway joint of claim 8, wherein the supporting means comprises at least one elongated support member mounted between the first flange and the first member.

12. The breakaway joint of claim 11, wherein the support member is comprised of a material which will corrode away in an ambient environment in which the breakaway joint is intended to be used after the period of time.

13. The breakaway joint of claim 3, further comprising means for encasing the breakaway joint.

14. The breakaway joint of claim 13, wherein the encasing means comprises a sleeve which is fitted over the breakaway joint.

15. The breakaway joint of claim 13, wherein the encasing means comprises a form which is molded over the breakaway joint.

16. The breakaway joint of claim 2, wherein:
   the receptacle of the first member comprises a first radial groove formed therein;
   the outer surface of the second member comprises a second radial groove formed therein which is located opposite the first radial groove when the second member is received in the first member;
   the latching and converting means comprises a latch ring having radially outer and inner portions which are disposed in the first and second grooves, respectively, to connect the first member to the second member;
   the second ends of the columnar members are coupled to the latch ring to maintain the latch ring in the first and second grooves; and
   the tensile load is reacted though the second groove and the latch ring to the columnar members, and when the columnar members buckle, the latch ring will move into the first groove and allow the first member to separate from the second member.

17. The breakaway joint of claim 16, wherein:
   the second groove comprises a radially outwardly facing cam surface; and
   the radially inner portion of the latch ring comprises a radially inwardly facing cam surface which is adapted to engage the radially outwardly facing cam surface; and
   movement of the second member away from the first member causes the outwardly facing cam surface to push the latch ring into the first groove.

18. The breakaway joint of claim 16, further comprising:
   a support member connected to an outer surface of the first member;
   wherein the first ends of the columnar members are connected to the support member and each columnar member extends through a corresponding hole formed in the first member between the support member and the first groove.

19. The breakaway joint of claim 18, wherein:

the support member comprises a plurality of threaded members which are received in corresponding threaded holes formed in the support member; and the first end of each columnar member is connected to a corresponding threaded member.

20. The breakaway joint of claim 2, wherein:

the receptacle of the first member comprises a first radial groove formed therein;

the outer surface of the second member comprises a second radial groove formed therein which is located opposite the first radial groove when the second member is received in the first member;

the latching and converting means comprises a latch ring having radially outer and inner portions which are disposed in the first and second grooves, respectively, to connect the first member to the second member;

the latching and converting means further comprises a reaction ring disposed in the first groove against the radially outer portion of the latch ring to maintain the radially inner portion of the latch ring in the second groove; and the second ends of the columnar members are coupled to the reaction ring to maintain the reaction ring against the latch ring;

the tensile load is reacted though the second groove, the latch ring and the reaction ring to the columnar members, and when the columnar members buckle, the latch ring will move into the first groove and allow the first member to separate from the second member.

21. The breakaway joint of claim 20, wherein:

the second groove comprises a radially outwardly facing cam surface;

the radially inner portion of the latch ring comprises a radially inwardly facing cam surface which is adapted to engage the radially outwardly facing cam surface of the second groove;

the radially outer portion of the latch ring comprises a radially outwardly facing cam surface;

the reaction ring comprises a radially inwardly facing cam surface which is adapted to engage the radially outwardly facing cam surface of the latch ring;

movement of the second member away from the first member causes the outwardly facing cam surface to push the latch ring into the first groove.

22. The breakaway joint of claim 21, wherein:

the first member comprises a plurality of threaded members which are received in corresponding threaded holes formed in the first member; and the first end of each columnar member is connected to a corresponding threaded member.

23. A breakaway joint for releasably connecting a first component to a second component, the breakaway joint comprising:

a first member to which the first component is attached, the first member comprising a receptacle;

a second member to which the second component is attached, the second member comprising an outer surface having a portion which is slidably received in the receptacle;

a first flange which is slidably mounted on an outer surface of the first member;

a plurality of columnar members each having a first end which is engaged by the first member and a second end which is engaged by the first flange;

a plurality of elongated members each having a first end connected to the first flange and a second end coupled to the second member;

wherein tensile loads acting between the first and second members are converted by the elongated members and the first flange into a compressive force acting on the columnar members; and wherein when the tensile load reaches a predetermined level, the columnar members will buckle and allow the first member to separate from the second member.

24. The breakaway joint of claim 23, wherein:

the first member comprises a second flange extending radially from its outer surface between the first flange and the second member;

the second flange comprises an angled side surface facing the first flange;

the first ends of the columnar members are engaged by the second flange;

the first flange comprises a split flange; and when the columnar members buckle, the elongated members will pull the first flange up and over the angled side surface of the second flange to allow the first member to separate from the second member.

25. The breakaway joint of claim 24, wherein the split flange comprises at least two segments which are held together by a retainer ring.

26. The breakaway joint of claim 24, further comprising means for adjusting the axial distance between the first flange and the second member.

27. The breakaway joint of claim 26, wherein the adjusting means comprises:

threads formed on at least the first end of each elongated member; and a nut which engages a portion of the first end which is inserted through a corresponding hole in the first flange;

whereby rotation of the nuts varies the axial distance between the first flange and the second member.

28. The breakaway joint of claim 23, further comprising means for temporarily supporting the columnar members so that the first member will remain connected to the second member for a period of time when the tensile load is higher than the predetermined level.

29. The breakaway joint of claim 28, wherein the supporting means comprises a support collar mounted on the first member between the first flange and the second member.

30. The breakaway joint of claim 29, wherein the support collar is comprised of a material which will corrode away in an ambient environment in which the breakaway joint is intended to be used after the period of time.

31. The breakaway joint of claim 28, wherein the supporting means comprises at least one elongated support member mounted between the first and second flanges.

32. The breakaway joint of claim 31, wherein the support member is comprised of a material which will corrode away in an ambient environment in which the breakaway joint is intended to be used after the period of time.

33. The breakaway joint of claim 23, further comprising means for encasing the breakaway joint.

34. The breakaway joint of claim 33, wherein the encasing means comprises a sleeve which is fitted over the breakaway joint.

35. The breakaway joint of claim 33, wherein the encasing means comprises a form which is molded over the breakaway joint.

* * * * *